United States Patent [19]

Bradley et al.

[11] Patent Number: 4,626,436

[45] Date of Patent: Dec. 2, 1986

[54] FROZEN BLOCK PROCESS FOR VEGETABLE OR FRUIT CONVENIENCE FOODS

[75] Inventors: Alan B. Bradley, Vermilion, Ohio; James H. Geary, South Hamilton, Mass.; James W. Hutchison, Bellevue, Ohio; Thomas S. Jones, Huron, Ohio; Donald A. Mather, Sandusky, Ohio; Scott D. Mather, Sandusky, Ohio; Thomas M. Surmiak, Sandusky, Ohio

[73] Assignee: Stein Associates, Inc., Sandusky, Ohio

[21] Appl. No.: 630,231

[22] Filed: Jul. 12, 1984

[51] Int. Cl.[4] .......................... A23B 7/04; A23L 1/212
[52] U.S. Cl. .................................... 426/289; 426/302; 426/615; 426/518; 426/292; 426/524
[58] Field of Search ............... 426/289, 615, 302, 438, 426/518

[56] References Cited

U.S. PATENT DOCUMENTS

| | | | |
|---|---|---|---|
| 1,955,484 | 4/1934 | Birdseye | 426/615 |
| 2,284,270 | 5/1942 | Eberts et al. | 426/524 |
| 2,828,211 | 3/1958 | Sanders | 426/512 |
| 3,078,172 | 2/1963 | Libby | 426/293 |
| 3,492,132 | 1/1970 | Partyka | 426/518 |
| 3,924,012 | 12/1975 | Marshall et al. | 426/518 |
| 3,976,798 | 8/1976 | Young et al. | 426/438 |

Primary Examiner—Raymond N. Jones
Assistant Examiner—Carolyn Paden
Attorney, Agent, or Firm—Baldwin, Egan & Fetzer

[57] ABSTRACT

A method is disclosed for producing convenience foods from food units coming from the grower in various sizes. The vegetable or fruit food units of various sizes, are cleaned and handled and frozen in a generally conventional manner, and then are compressed by a high capacity press into a standard predetermined size of frozen block of food product, after which the block is cut by sawing, into generally equal size units which can then be further processed, such as for instance batter coated and cooked, and then packaged by count, prior to shipment.

14 Claims, 6 Drawing Figures

FROZEN BLOCK PROCESS FOR VEGETABLE OR FRUIT CONVENIENCE FOODS

This invention relates to a method for producing convenience foods and to a new and novel convenience finger food from food units as grown of various sizes, such as for instance as occurs in vegetables and fruits, and wherein all or substantially all of the end food product comprises the selected vegetable(s) or fruit without any binding material utilized therein, and further wherein the end resultant food product pieces are all of the same weight and configuration. The method of the present invention is particularly adaptable for the production of battered and breaded convenience food pieces especially vegetables, in which it is desirable to have a natural "mouth feel" to the product after the processing thereof.

BACKGROUND OF THE INVENTION

A growing segment of the frozen food industry is the preparation of convenience foods and "finger foods". These foods are usually specially prepared so that the purchaser saves much time in final preparation for eating. An illustration of convenience food is frozen french fried potatoes which may be oven heated by the purchaser because the original processor blanched them in oil. Other examples come to mind, like frozen complete dinners, frozen breaded fish portions, and the like.

Finger foods is the term generally given in the related art to battered, breaded bite-sized portions, chunks or elongated sticks which may be prepared by a variety of methods suitable for finger selection by the individual consumer.

Heretofore convenience foods utilizing vegetables or fruit have entered the market within the last decade or so, and have been developed and presented to the consumer in basically two different types of "finger foods". One type of vegetable or fruit finger foods includes individual vegetable or fruit pieces in their natural state which are either battered, breaded and frozen or battered, breaded, deep fat fried to set the coating and impart oil and frozen to be reheated by the purchaser.

The list of such natural food products includes for example onion rings, mushrooms, zucchini slices, cauliflower buds, clarets or heads, eggplant slices and chunks, apple and pineapple slices. However, several problems continue to plague the processor and increase his costs in the processing of this type of finger food product. One is the fact that many vegetables and/or fruit pieces may vary excessively in size, so that the processor must sort and pack into various size ranges to please the consumer. Even when sorting, the processor oftentimes cannot pack by count and rely on accuracy in weight, so he must pack by weight, which means the packer must select various sizes of the food product in an effort to arrive at the desired weight, which is costly in labor because it requires judgment by the workers. Another problem is that individual vegetable pieces are difficult to arrange on high speed processing lines so that the arranging becomes still more labor intensive. Another problem is that a substantial quantity of the vegetable or fruit product in its natural state cannot be used because, even though the food is wholesome and nutritious, it may be unattractive in size, shape, texture, etc.

A second type of vegetable or fruit finger foods is for the processor to take vegetable or fruit pieces which may include scraps which, heretofore have been discarded as waste but which are still wholesome for human consumption, and to thoroughly mix them with a suitable binder, well known in the art, into a porridge-like mixture. This mixture is then extruded into a shape that, in an effort to gain consumer acceptance, is oftentimes made to simulate the shape of the vegetable or fruit in its natural state. As will be appreciated, the taste of such extruded product is not particularly characteristic of the "natural taste" of the food product per se but rather to a significant degree is characteristic of and dependent upon the binder used which the consumer finds unattractive and unacceptable.

Heretofore the assignee of the present invention has utilized a process using fish and poultry products in which individual frozen pieces of fish or poultry are placed into a suitable press and compressed under substantial pressure into a frozen block. Because fish and poultry are known to be inherently high in protein, it is believed that during this compression, weeping or protein secretion occurs which enables the individual pieces to adhere to each other to form the frozen food block as well as in subsequent cooking of the food pieces.

To the present time in the food processing industry it has been generally believed that this frozen block process is not adaptable to other products such as vegetables and/or fruits and like products by reason of their lacking the type of protein found in fish or poultry.

As will be hereinafter explained in greater detail, the applicants hereof have discovered a new and novel process heretofore unknown in the related art for making vegetable and fruit finger foods, which process incorporates therein the formation of a frozen block of vegetables and/or fruit and the like and wherein the raw vegetable or fruit food material, in its natural and frozen state, constitutes all or substantially all of the food product that is in the end "finger food" product resulting from this process. The term "raw vegetables" is hereinafter identified to be the products presently available in the frozen food department of a typical market which conventionally may be either raw or blanched, i.e. partially cooked.

SUMMARY OF THE INVENTION

This invention is directed to a new and novel method for the preparation of a new and novel battered and/or breaded vegetable and/or fruit convenience type "finger food" and to such novel and new "finger food" product, and wherein the raw food material in its natural and frozen state is incorporated into and constitutes all or substantially all of the food product in the "finger food" resulting from the method of this invention. The finger food pieces as made by the method of this invention may or may not be all the same weight and/or configuration, and further the food pieces may be automatically and consistently arranged on high speed processing lines with minimum labor, wherein the end finger food product of the method is wholesome, nutritious, flavorful, and has a natural product taste and "mouth feel", and does not involve any foreign substance used solely for binding the pieces together.

One object of this invention is to provide a convenience food made of selected vegetables and/or fruits and wherein all or substantially all of the end product comprises the selected vegetable(s) or fruit without any binding material utilized therein.

Another object is to provide a convenience food product which eliminates variation in the configuration of battered and breaded convenience food pieces, especially vegetables, whereby the food pieces may be efficiently and speedily packaged as convenience food at relatively low cost, yet the food pieces will retain natural "mouth feel" and high quality.

Another object is to provide a convenience food product of selected vegetables and/or fruits and wherein each food piece or finger food is of uniform weight enabling it to be sold and/or served in equal servings or portions.

Another object is to provide for fast, reliable and automatic production of such convenience food products on high speed processing lines, thereby minimizing labor handling costs.

A further object is to adapt this method to the use of presently available processing equipment in the related art such as is presently used in the fish industry for processing fish portions and sticks.

Another object is to provide for utilization of a much higher than normal percentage of raw food material, especially vegetables or fruit, in prime convenience food.

Another object is to provide for the intermixing of vegetables or other food products such as cheese at any percentage desired in the same product.

A further object is to provide for the utilization of certain vegetables heretofore not usable in this type product.

Another object is to allow for more economic handling of the raw food products or frozen block because of uniform size, weight, and compaction (density).

Other objects will become apparent to one skilled in the art through study of this disclosure; and wherein:

DESCRIPTION OF THE PREFERRED EMBODIMENT

Figure 1:
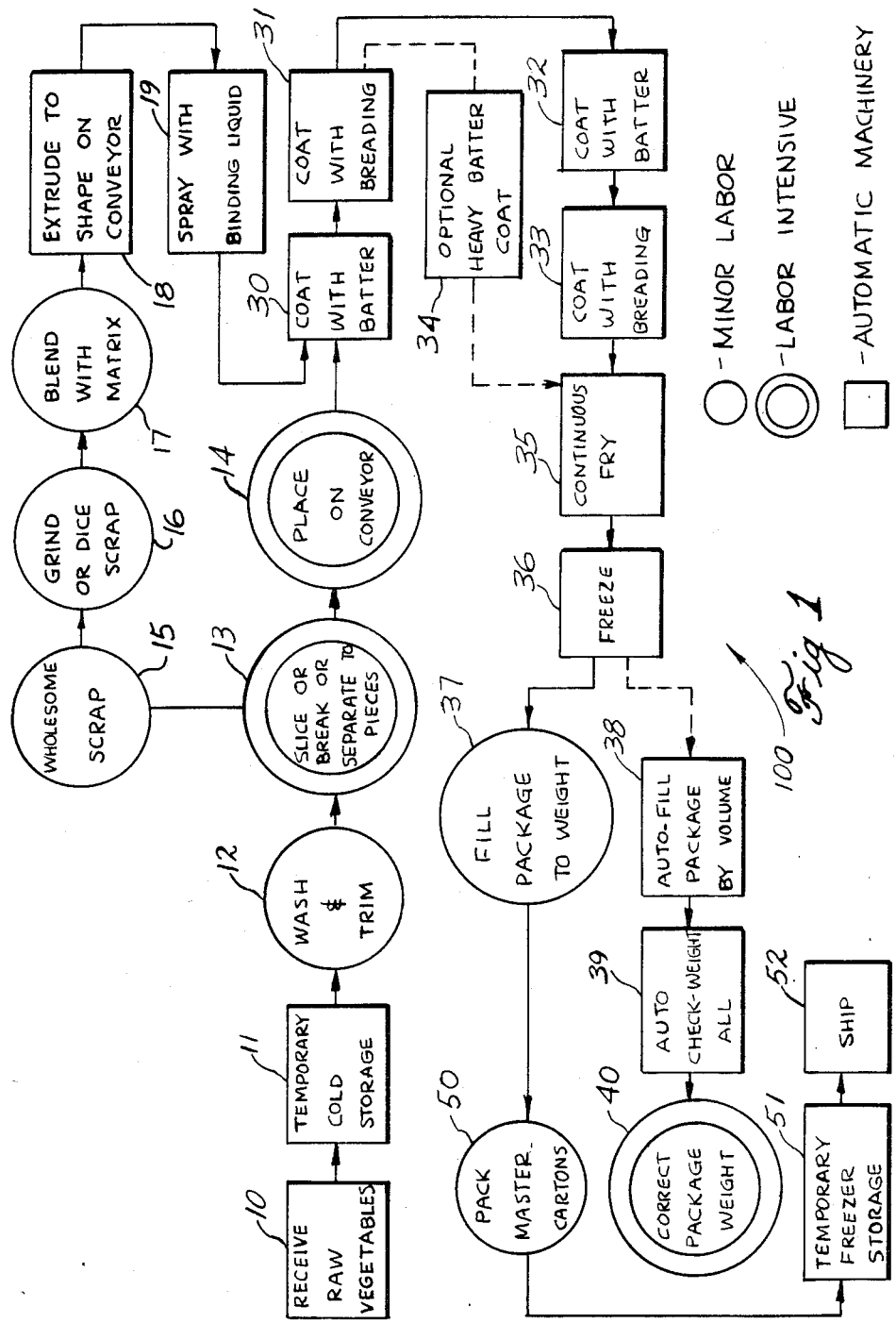
FIG. 1 is a flow diagram of a typical prior art vegetable processing line wherein natural shapes of vegetables are processed as convenience foods.
Figure 2:
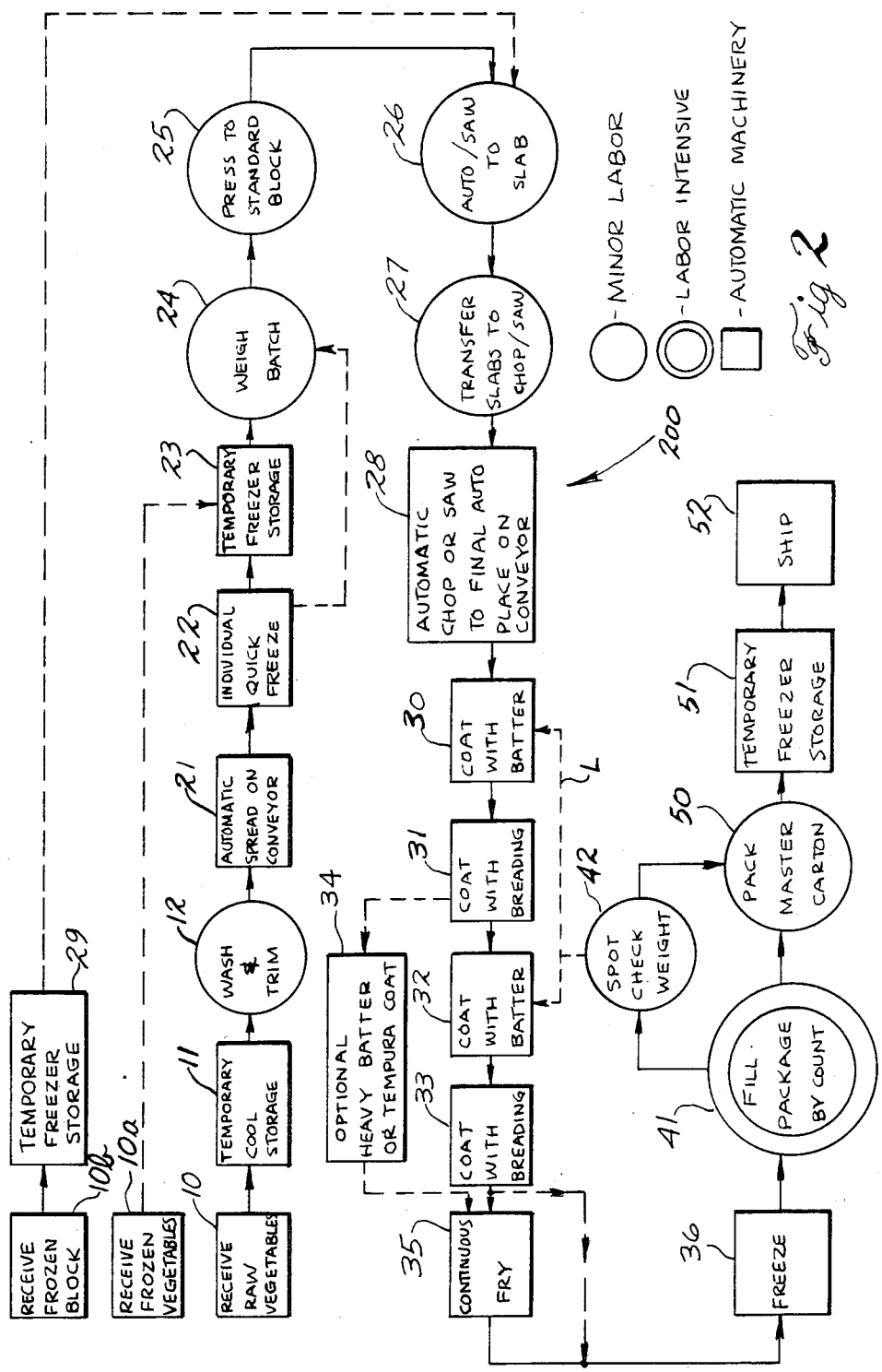
FIG. 2 is a flow diagram of a vegetable processing line utilizing the method of this invention.

Referring to FIGS. 1 and 2, a comparison may be made between a present conventional processing line 100 for vegetable processing for the two types of finger foods as heretofore mentioned and the block processing line of this invention 200, both lines producing convenience type "finger food" pieces which are coated with batter and breading, which may be deep fat fried, and then individually quick frozen before packing. Numerals assigned to the various operating stations are the same in each Figure when the operating stations are identical. Thus it may be seen that the main differences in the two processing lines, 100 and 200, lie in the piece preparation between wash-and-trim 12 and coat-with-batter 30, and piece packaging between freeze 36 and pack-mastercarton 50.

In each processing line 100 or 200, identical facilities for receiving raw vegetables at a station identified at 10 are provided, along with facilities for temporary cold-cool storage at a station 11 to retard spoilage before use. Such facilities at all stations in both processing lines may be interconnected by suitable conveying apparatus, such as a conventional mesh-belt type of conveyor or the like now in common use in the food processing industry as identified schematically at C. Unwholesome parts and adhering debris must be removed at station 10 before vegetables are cut up or separated into small pieces. Further, after each separation, either line 100 or line 200 has facilities for coating, possibly frying and freezing the product, such processing being accomplished in a batter machine at station 30, a breading machine at station 31, a second batter machine at station 32, a second breading machine at station 33, a fryer at station 35 and a freezer at station 36. An alternate method common to both processing lines 100 and 200 of coating the food product may involve dipping product pieces into a suitable batter at station 34 rather than using the last set of batter-breading machines 32, 33. Finally, the food product is packaged by weight, and master cartoned at 40, temporarily stored in a freezer at 51 and shipped at station 52. Any variations in the equipment common to both lines, as described in this paragraph, can be identical for both lines 100 and 200. Such equipment for accomplishing these automatic operations are well known in the related art, and will be briefly described hereinafter.

Referring now to FIG. 1, the special handling and equipment for a conventional vegetable processing line 100 will now be described. In general, for one type of product previously mentioned, i.e., the natural state, most vegetables cannot be coated in their natural state because they are too large. Exceptions include small mushrooms and some peppers. Consequently, the vegetables selected for this process are taken out of the temporary storage at station 11 and washed and trimmed, and then presented to station 13 for further reduction in size. The equipment at station 13 is adapted to process all the vegetables that the processor wishes to utilize. For instance, zucchini requires slicing, eggplant may require slicing in two or three directions, onions may require slicing and separation into rings, cauliflower requires breaking into useful size buds, and so on. In each case much labor is generally required for handling pieces, especially odd shaped pieces like cauliflower buds. Onion rings are a special case because many of the small diameter rings plus the end pieces do not make satisfactory product. In many cases of vegetable processing, a substantial proportion of the vegetables are scrap at this stage, not utilizable in prime product, but certainly wholesome and worth saving as will be described later. This work station 13 can be very labor intensive as indicated in FIG. 1 by the double circle legend. Cauliflower, for instance, can only be broken apart into buds, and the extent of break-apart, being normally manually accomplished, is a matter of judgment for the worker to decide, whereby many tiny buds may be inadvertently produced. Individual mushrooms may be cut in two, in four or allowed to pass whole.

Onions are mostly automatically sliced and sorted with human inspection and correction. As a result it becomes necessary that the required equipment and personnel variations at station 13 are almost endless for different vegetables, so that the processor is frequently limited to processing those vegetables which "match" in separation requirements, or in the alternative he must have several different types of processing equipment available as needed.

From work station 13 the food product pieces may be placed onto an interconnecting conveyor C at 14 which, in most cases, is done by hand in order to separate the pieces so that they do not later fry together, yet the pieces should be close enough on the conveyor so that the coating, frying and freezing machinery is well loaded. This operation can be extremely labor intensive as is also similarly identified by the double circle legend. As an illustration, if the product path through processing stations 30 to 36 is thirty inches wide as determined by the selected conveyor C and the conveyor travels at thirty feet per minute and product spacing is two inches one way by three inches the other way, then each square foot of belt should carry twenty-four pieces of food product, while the total belt may carry eighteen hundred pieces per minute. If each worker can place 150 pieces per minute (a very high rate), then twelve workers would be required to keep the conveyor belt loaded at station 14.

As mentioned above, considerable wholesome scrap may be generated at station 13 during separation into small pieces, scrap which should be utilized in the interest of economy. The flow diagram of FIG. 1 illustrates one possible prior art method of using this scrap for the second type of product, i.e., extruded, especially in the processing of onions. The scrap is collected at station 15, transported to station 16 where it is chopped, ground, finely diced or otherwise minced. The scrap may then be transferred in batches or by a conveyor C to a mixing station 17 where it is blended into a porridge-like mixture with a matrix well known in the art which binds such scrap pieces together after extrusion at station 18. Transfer to the hopper of the extruder 18 may occur in any of several ways, either by batch or conveyor, but requires some labor. After extrusion onto a conveyor belt C in the pattern desired, the extruded pieces may be sprayed at station 19 with a special liquid known in the art, which creates a skin on the extruded piece so that it can be conveyed and transferred through the subsequent coating, frying and freezing process steps as illustrated at stations 30, 31, 32-36. As aforementioned, this extruded product suffers in consumer acceptance principally by reason that it does not have a natural taste but rather a taste that is characteristic of the binder material used.

When pre-packaging food of almost any kind, individual packages must contain a net weight of product no less than that pre-printed on the label, and as little excess as possible. Any shortages in weight may be interpreted as mis-marking, while any excess weight is a free gift to the consumer. Therefore, packaging closely to net weight is extremely important to the processor. However, when pieces to be placed into a package vary greatly in size and shape, it is difficult to package them automatically. Thus, the finished food product received from the freeze station 36 may be hand packaged in a suitable carton by weight as at packaging station 36 which requires many workers but results in accurate weights, or an alternate method is to auto-fill the packages to a nominal weight as a packaging station 38, and to then check weigh all packages at weighing station 39, and have workers add or subtract pieces as indicated at weight correcting station 40. Fewer people are usually necessary in the latter case because fewer packages must be corrected. As indicated in FIG. 1, intensive labor, i.e., double ring legend, is required in at least three places, at stations 13, 14, and 37 or 40. Additional labor, though usually a lesser amount, is required at stations 12, 15, 16, 17. The elimination of some of this labor is one justification and patentable distinction for the block processing line 200 of this invention.

Figure 3:
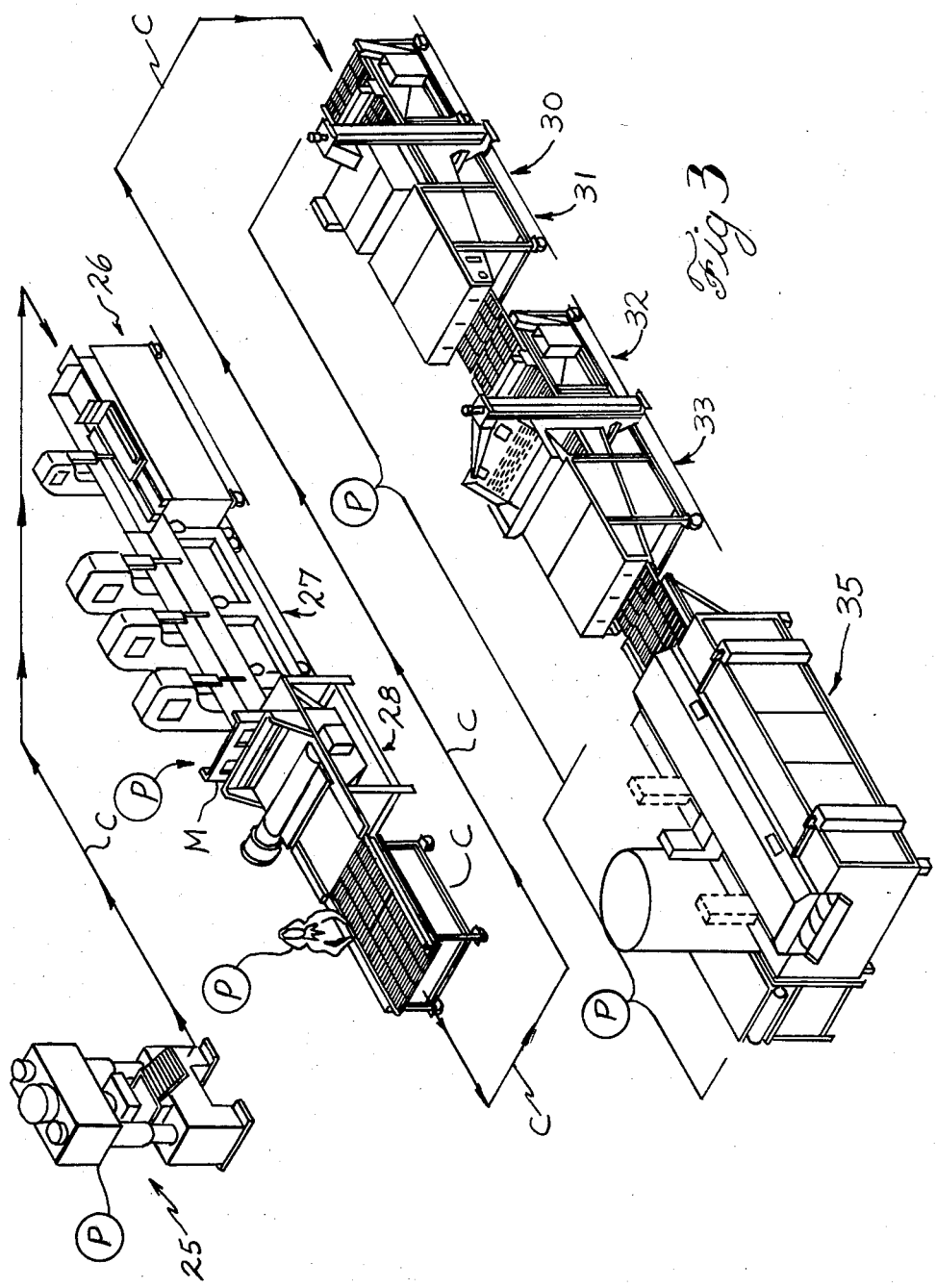
FIG. 3 is an isometric view of a processing line for processing convenience foods by the process of the present invention and which line utilizes presently commercially available equipment.

Referring now to FIGS. 2 and 3 the novel method of processing convenience foods of the present invention will now be described.

As seen in the flow diagram of FIG. 2 a typical processing line for practicing the process of the present invention as identified in its entirety at 200, may include several of the same types of equipment at several of the process stations as previously utilized in the process line 100 of FIG. 1 which is in present use today.

For example, processing line 200 of the present method may incorporate the use of initial processing stations 10, 11 and 12 for receiving the raw food product selected to be processed; temporary cooling of the food product at a suitable temperature to prevent spoilage and for cold water washing and trimming the food product.

The individual food product pieces are then presented to a conveyor C at station 21 which may include conventional equipment such as an overhead hopper or the like for automatically spreading said pieces evenly across the usable width of the conveyor C. The conveyor as thus loaded carries the individual pieces into a suitable quick freeze unit at station 22 which unit may be any one of a number presently commercially in use, such as a nitrogen or $CO_2$ freezer unit wherein the individual food pieces are quick frozen to a suitable temperature which at present is within a temperature range of approximately $-10°$ to $+10°$ Fahrenheit.

From freeze station 22 the frozen food pieces may be placed, if desired, into a temporary freezer storage room at station 23 or alternatively may be conveyed directly by a conveyor C to weigh-batch equipment at station 24, which equipment may comprise any suitable type of weighing apparatus such as a hanging scale or a platform or pan-type scale at which a preselected batch weight of the frozen food product is determined, as for example, a batch weight of sixteen (16) pounds. As will be understood other batch weights may also be selected As aforementioned, to the present time in the food processing industry to which this invention relates, it has been generally believed that it is not possible to form a frozen block of vegetable and/or fruit food products in their natural state by reason that they lack natural binding material such as protein that is in fish or poultry and which enables the processor to form a frozen block of such food product in the manufacture of fish or poultry convenience food products.

However, the present applicants have discovered surprising and unusual results in that it is possible to form a frozen block of vegetable or fruit in their natural state by taking such in the size (bite size or the like) that is commercially available in the frozen food department of a typical market which as known in the art may conventionally be either raw or blanched, i.e. partially cooked, and while said products are at a temperature within the range of approximately $-10°$ to $+10°$ Fahrenheit and then placing them into the mold cavity of a press at station 25, as depicted in FIG. 3, and exerting substantial pressure on said products in the range of approximately 100–1500 lbs/in$^2$ a satisfactory frozen block of food product is formed wherein the individual food pieces adhere to each other sufficiently to enable said block to be subsequently fabricated as will be hereinafter described. It is believed tha during this pressing operation binding of the individual food pieces occurs by reason that ice crystals in the frozen food pieces react with ice crystals on adjacent food pieces to affect welding of said pieces together sufficiently to adequately bind the same together into an integral block. One press readily adaptable to this process is the Model 75 Bettcher Press made by Bettcher Industries, Inc. of Vermilion, Ohio, which is capable of exerting a compressive force within the range of approximately 100–1500 lbs/in$^2$ of product. Another press capable of this work is hydraulic press Model BSP-2P Block Sizing Press made by Pearce Equipment, Inc. of Danvers, Mass. which typically may exert approximately fifteen hundred pounds of compressive force per square inch on the food product.

The press is operated to compress the individual food pieces into a frozen block B of food product in which the food pieces are pressed to thus form a substantially homogeneous food product dispersion throughout while the food product remains frozen. In the compression the individual food pieces retain their initial piece shape and texture with only possible very minor distortion, if any at all.

Figure 4:
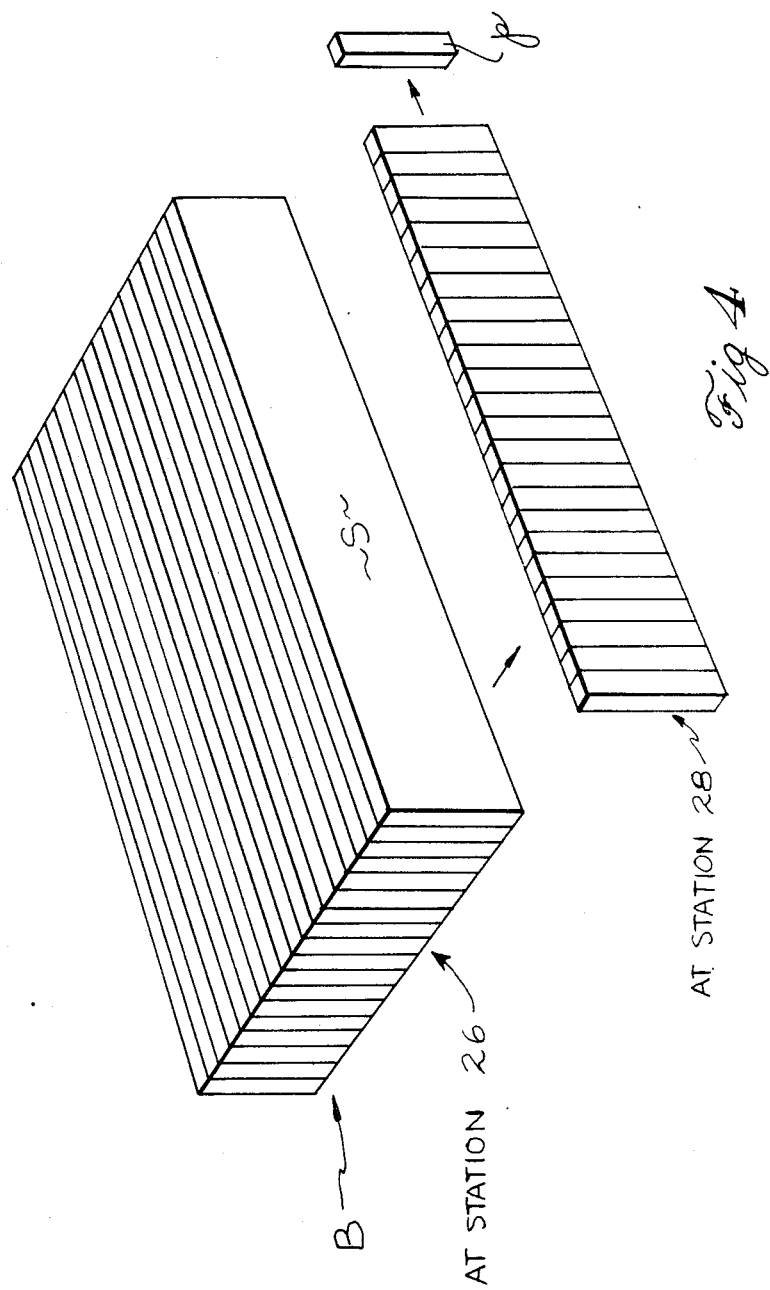
FIG. 4 is an isometric view of a frozen pressed block of convenience foods formed in the process of this invention and showing one possible way to divide it into sticks or fingers.
Figure 5:
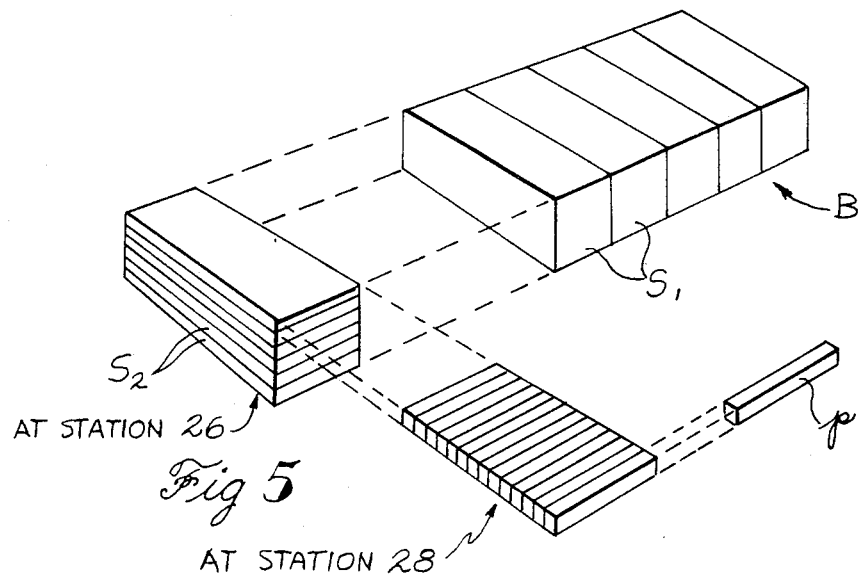
FIG. 5 is an isometric view of a frozen pressed block of convenience foods showing a second possible way to divide into sticks or fingers.
Figure 6:
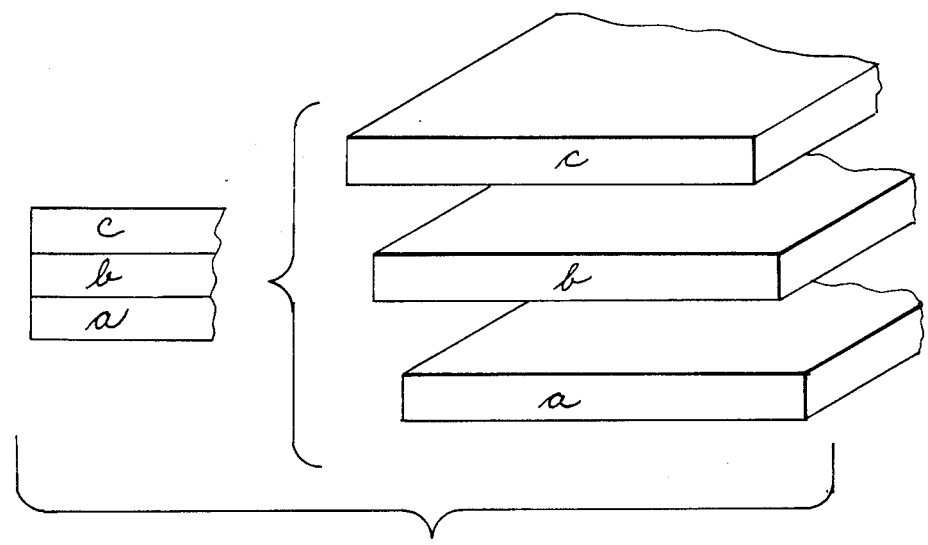
FIG. 6 is an isometric view of a frozen pressed block formed of at least three different convenience foods which may be layered within the block.

The block B, as will be understood, may be of any desired geometric configuration, one selected configuration being a polygonal solid as illustrated in FIGS. 4–6 which may have a typical rectangular cross-sectional dimension of approximately four inches by ten inches with a length of approximately twenty inches. The press is capable of forming the block B at food product temperatures as low as −10° Fahrenheit.

The block B is then placed onto a conveyor C and presented to station 26 whereat it is sawed into slabs, as identified at S in FIGS. 4 and 5. A suitable saw as illustrated in FIG. 3 at station 26 is an Automatic Feed Band Saw Model AFBS manufactured by Pearce Equipment, Inc. of Danvers, Mass. The slabs S are then carried by conveyor C to a second saw station 27 whereat each slab may be turned on its narrow side or edge and cut into four slabs each of correspondingly thinner thickness. Turning of the slab onto its narrow side may be automatically accomplished by the saw at station 27 or performed manually. One such saw capable of suitable performance is depicted in FIG. 3 at station 27 and identified as a Triple Band Saw also manufactured by Pearce Equipment, Inc. of Danvers, Mass.

The slabs exiting from station 27 are then deposited into a vertical magazine M as seen in FIG. 3 at station 28, at which station the slabs are further individually sawed or chopped into individual product or finger-size pieces p. One exemplary type of equipment for use at station 28 for this purpose is identified as a Vertical Cut Portion Cutter manufactured by Pearce Equipment, Inc. of Danvers, Mass.

The individual pieces are then conveyed by a conveyor C to a first batter stage at station 30 whereat the pieces are covered with a suitable liquid batter, one exemplary suitable machine for this purpose being the XL34 Batter Machine manufactured by Stein Associates, Inc. of Sandusky, Ohio.

The battered pieces are next conveyed to station 31 whereat a suitable first breading coat is applied to the battered pieces. One suitable exemplary machine for this purpose is the XL34 Breading Machine as manufactured by Stein Associates, Inc. of Sandusky, Ohio.

The breaded pieces are then conveyed to a second batter and breading stage as indicated at 32 and 33 whereat a second batter coat and breading coat are applied, wherein the second breading coat may be more coarse than the first coat. The second batter coat may be applied at station 32 with similar type of Stein equipment as at station 30 and the second breading coat may be similarly applied at station 33 with equipment similar to the breading machine at station 21.

The pieces as thus battered and breaded may then be presented to a cooking station 35 whereat they may be deep fried, or alternatively conveyed by conveyor C directly to a suitable fast freeze station 36 whereat they may be quick frozen in an uncooked state. Inasmuch as the food pieces are processed while they are in a frozen state as presented to the various work stations 26–33, they should still be in a frozen state when exiting from the second stage breader at station 33 and conveyed to freeze station 33 and they may be simply lowered slightly in temperature to the desired temperature for storage of ±10° Fahrenheit.

An optional coating such as tempura and/or a dehydrated fruit coating may, if desired, be applied at station 43, which coated product may be either fried or frozen directly at station 36.

A suitable fryer for use at cooking station 35 may be the FB/FD Custom Direct Fired Fryer as manufactured by Stein Associates, Inc. of Sandusky, Ohio.

After frying, the individual food pieces are conveyed by conveyor C to the fast freeze station 36 to be quick frozen. Any suitable freezer equipment may be employed at station 36 as for example the same type of equipment utilized at freezer station 22.

After quick freezing at station 36, the individual food pieces are conveyed to station 41 for packaging by piece count.

The packing operation in the block processing method of the present invention varies considerably from that of a conventional processing line 100 as depicted in FIG. 1. Since in the present process all product pieces are the same size and shape, packages may be designed to accept any number of pieces desired. Then, when product is properly oriented according to package design, the correct count of pieces is obtained. But very importantly, because product pieces are identical, it is possible to control package weight by count. Occasional check weighing may be undertaken at station 42 to indicate whether packages are within desired weight tolerances. This information can be fed back to automatic batter mixers or portioning devices as schematically indicated by the dotted line L weight control which may continually correct for weight tolerances. By slight variations in batter viscosity, or portion thickness of vegetable sticks, package weights can be held to very close tolerances, and the judgment function of package fillers is reduced, therefore these workers can produce more than the workers of stations 37 or 40 of the conventional processing line 100 of FIG. 1.

From the packaging station 41, the package food pieces may be conveyed to a second packaging station 50 whereat they are placed into a master carton of larger volume and then placed into a temporary freezer storage at station 51 while awaiting future shipment at station 52.

Several alternate processing steps are anticipated particularly in the initial stages of the block processing method of the present invention as is illustrated in line 200 especially when the industry becomes mature enough to support and recognize the variations that may be made thereto. For example, it is believed that it will be possible to receive already cleaned and trimmed vegetables in frozen bulk, as at station 10a, which may then eliminate work stations 11, 12, 21, and 22. It is also conceivable that certain processors will concentrate on making standard sized blocks which will then be made available to the processors of the present invention so that frozen blocks of the same size could be received as at station 10b which may be temporarily stored in freezer storage 29 to be subsequently presented directly to the saw equipment at station 26 to further eliminate stations 23, 24, 25 in the final processing plant.

It will also be noted as seen in FIGS. 2 and 3 that only station 41 for package filling can be considered as labor intensive, while at six other stations 12, 24, 25, 26, 27 and 42 require some labor.

As also seen in the processing line of FIG. 3, an attendant as depicted by letter P may be stationed at station 28 to load themagazine M if it is to be hand fed and between stations 27 and 28 to monitor the conveyor C. Monitoring attendants P may likewise be provided at the block press station 25 and in the area of the line between batter station 30 and fryer station 35.

As will be understood in the art, many different shapes and/or sizes may be selected for the individual portion or finger pieces, several of which are illustrated in FIGS. 4 and 5. As seen in FIG. 4, the frozen compressed food block B is divided into a plurality (thirteen) of slabs S with each slab extending longitudinally of the block B and with each slab S being cut or chopped into twenty-four individual portions of finger pieces p wherein the dimension of each piece is approximately four (4) inches by three-quarters inches square.

The block B of FIG. 5 of the same dimension as the block of FIG. 4 is shown initially divided into five slabs $S_1$, each of which is then again divided in the same transverse direction into seven (7) slabs $S_2$ and then cut or chopped into individual portions or finger pieces p, the dimensions of which each are approximately four (4) inches by one-half inch square.

It is also contemplated that a block B may be formed of multiple layers of different food products and wherein it may also be desirable to retain each different food product within the boundaries of its respective layer. Such a layered block B is illustrated in FIG. 6, and merely as an example, said block is seen to comprise three layers a, b and c wherein layer a may be broccoli, layer b cauliflower and layer c a selected cheese. While not shown it is also contemplated that several or more different food products may be substantially evenly dispersed throughout the block B so that the resultant individual portion may consist of a plurality of different food products either layered or dispersed therethrough. It is also contemplated that other food products in their natural or processed state such as bacon pieces may be mixed with a suitable vegetable with the latter constituting the major ingredient of the end product may be readily adaptable to the present process.

The new and novel "finger-food" product thus produced by the process of the present invention is thus seen to comprise the selected food product in its natural and frozen state and constitutes all or substantially all of the end food product in the resultant finger-food and has a natural taste and mouth feel characteristic of the selected food product.

Having thus described one embodiment of block press method for convenience foods and the like and several configurations of frozen food product blocks for use therein, it will be realized by one skilled in the art that various modifications may be made thereto without departing from the inventive concepts as are defined in the claims.

We claim:

1. A method for producing edible foods in a natural state from raw or partially cooked vegetable or fruit food units comprising the steps of freezing a plurality of irregularly shaped said food units to a temperature in the range of about $-10°$ F. to $+10°$ F., placing the frozen food units in the absence of extraneous binding material into block forming means and exerting pressure thereon within a range of about 100–1500 lbs/in$^2$ sufficient to form said units into a compact unified frozen block.

2. In a method as is defined in claim 1 and wherein the block is cut into a plurality of food units or finger pieces.

3. A method in accordance with claim 1 further comprising packaging of said units by count.

4. A method in accordance with claim 1 further comprising cutting of said block into equal size units.

5. A method in accordance with claim 4 wherein said block is cut into equal size units by sawing.

6. A method in accordance with claim 1 wherein said pressed food units are rectangular in shape.

7. A method in accordance with claim 6 wherein said block is approximately twice as long as it is wide and about two and one-half times as wide as it is thick.

8. A method in accordance with claim 1 wherein pressing of said pressed food units is accomplished by providing a predetermined weight of food units.

9. A method in accordance with claim 2 further comprising the step of coating the plurality of units with one or more liquid or dry coating materials.

10. A method in accordance with claim 9 further comprising frying the coated units.

11. A method in accordance with claim 1 wherein after the cutting of the block into a plurality of units, the units are first coated with batter and then coated with breading and then recoated with batter and then recoated with breading.

12. A method in accordance with claim 9 including the step of refreezing the uncooked units after coating.

13. A method in accordance with claim 2 including the steps of receiving the food units, temporarily cooling and storing the same, washing and trimming the food units and placing them on a conveyor for transmittal into a freezing mechanism for freezing the units, and then batch weighing the units prior to pressing the same into said predetermined size block.

14. A method in accordance with claim 1 including the step of batch weighing various sizes of food units prior to pressing the batch weighed units into said predetermined size frozen block.

* * * * *